United States Patent
Wan

(10) Patent No.: US 10,003,787 B1
(45) Date of Patent: Jun. 19, 2018

(54) METHOD, SYSTEM AND APPARATUS FOR REFINING A DEPTH MAP

(71) Applicant: CANON KABUSHIKI KAISHA, Tokyo (JP)

(72) Inventor: Ernest Yiu Cheong Wan, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 15/387,308

(22) Filed: Dec. 21, 2016

(51) Int. Cl.
G06K 9/00 (2006.01)
H04N 13/00 (2018.01)
H04N 13/02 (2006.01)
G06T 7/12 (2017.01)
G06T 7/13 (2017.01)

(52) U.S. Cl.
CPC .......... *H04N 13/0271* (2013.01); *G06T 7/12* (2017.01); *G06T 7/13* (2017.01); *G06T 2207/10024* (2013.01); *G06T 2207/10028* (2013.01)

(58) Field of Classification Search
CPC .......... H04N 13/0271; G06T 7/12; G06T 7/13
See application file for complete search history.

(56) References Cited

U.S. PATENT DOCUMENTS

| 8,106,924 | B2 | 1/2012 | Aliprandi et al. |
| 9,369,689 | B1 | 6/2016 | Tran et al. |
| 2009/0196492 | A1* | 8/2009 | Jung .......... G06K 9/20 382/154 |
| 2010/0182410 | A1* | 7/2010 | Verburgh .......... G06T 7/0071 348/51 |
| 2013/0076873 | A1* | 3/2013 | Oshikiri .......... H04N 13/00 348/51 |
| 2015/0043783 | A1* | 2/2015 | Ishihara .......... G06T 7/0069 382/106 |
| 2015/0206312 | A1* | 7/2015 | Luo .......... G06T 7/0081 382/173 |
| 2016/0063715 | A1* | 3/2016 | Wan .......... G06T 3/40 382/195 |
| 2016/0239980 | A1* | 8/2016 | Tian .......... G06T 7/11 |
| 2016/0275691 | A1* | 9/2016 | Domanski .......... G06T 7/0075 |
| 2017/0094243 | A1* | 3/2017 | Venkataraman .... H04N 13/0007 |
| 2017/0302910 | A1* | 10/2017 | Richards .......... G06T 7/0075 |

* cited by examiner

*Primary Examiner* — David F Dunphy
(74) *Attorney, Agent, or Firm* — Canon USA, Inc. I.P. Division

(57) ABSTRACT

A method of refining a depth map determines a depth map by estimating a depth of pixels of an associated image. The depth map is divided into connected components based on similarity of each of the pixels of the depth map. A band of pixels along a boundary of each of the connected components is selected. A confidence score is assigned to pixels within each band of pixels. The confidence score increases with the estimated depth of the pixels. The depth map is updated based on the assigned confidence scores to determine a refined depth map.

10 Claims, 9 Drawing Sheets

METHOD, SYSTEM AND APPARATUS FOR REFINING A DEPTH MAP

TECHNICAL FIELD

The current disclosure relates to the refinement of depth maps and, in particular, depth maps created using stereoscopic images, structured lights, and Light Detection and Ranging (LIDAR). The present disclosure also relates to a method, system and apparatus for generating a depth map, and to a computer program product including a computer readable medium having recorded thereon a computer program for generating a depth map.

BACKGROUND

Depth maps can be produced by means of stereoscopic images, structure light, LIDAR, depth from focus (DFF), depth from defocus (DFD).

Depth information can be estimated from a pair of stereoscopic images of the same scene captured by two (typically identical) light sensors or cameras displaced by a certain distance known as the baseline from each other. A disparity map is extracted from the image pair (also known as stereo pair) and is constructed by matching corresponding points in the stereo pair. Disparity is the relative displacement of corresponding points in the stereo pair and can be converted to depth z using Equation (1), below:

$$z = \frac{fb}{d} \quad (1)$$

where f is the focal length, b is the baseline and d is the disparity.

When estimating depth from structured light, a light source (typically, an infrared (IR) light source) may be used to project a known pattern of light onto the scene. A sensor displaced by a certain distance from the light source may be used to capture the resulting image. By measuring the distortion of the known pattern, a depth map of the scene is estimated.

With LIDAR, a laser light is used to illuminate a scene while a laser detector picks up the reflection. Given the known speed of light, the depth of a scene can be estimated by measuring the time-of-flight of the laser signal in the case of a scanning LIDAR device, and by measuring the amount of laser light received in the case of a scanner-less LIDAR device (whose image sensor and laser source has a shutter that opens and closes at the same rate).

The depth map estimated by the above methods provides three dimensional (3D) information of a scene. Objects in a scene typically form connected pixels of slowly varying depth, and objects at different depths appear as separate connected components in the depth maps. The boundaries of these connected components, where significant change in the estimated depth occurs, may be referred to as depth boundaries.

Depth maps produced using the above methods have some problems in common, namely,
  depth boundaries that do not align with edges of the objects in an associated image,
  regions (including occluded regions) that have no depth estimates, and
  the depth maps have lower resolution than the corresponding images The misalignment between depth boundaries and object edges is more pronounced
  for moving objects due to motion blur,
  for objects that are closer to the camera, and
  along one axis (e.g. in the horizontal compared to the vertical direction) due to the relative position of the two sensors—two colour light sensors, one colour light sensor and one laser sensor, or one colour light sensor and one IR sensor as well as the relative position of the IR/laser source and the associated sensor.

FIG. 2A shows a sample depth map 200 obtained using a known method and some common problems of the depth estimates of the map 200. Depth map 200 shows the depth profile of an open-plan office that has a suspended ceiling around light fittings and ductwork. Depth map 200 also shows a person in the foreground.

A large part of depth map 200, such as the regions 210 and 220, have no depth estimates. A number of reasons may explain the lack of a depth estimate for a pixel in the depth map 200 including:
  the associated object is out of (depth) range,
  the pixel falls outside the view covered by the sensor,
  the associated surface does not reflect the projected IR pattern, or
  an occlusion region (e.g., occlusion region 220) blocks the light source from illuminating the object at that position in the capture image.

In the case of a LIDAR system, some surfaces may not reflect the laser light and, in the case of a stereo depth system, some surfaces may have little texture to enable correspondence search of a stereo pair, resulting in no depth estimates for those surfaces.

Some objects do not reflect the IR light well, such as the dark monitor screen at 230, and the resulting depth estimates are very noisy.

Reference 240 in FIG. 2A indicates the depth boundary of the right arm of the person close to the camera. FIG. 2B shows an expanded view 260 of 240. As seen in FIG. 2B, the image of the arm is overlaid on top of the depth estimates. The depth values of the arm 262 can be seen to bleed from the actual edge 264 of the arm into the background which, at some places, is by as much as twenty (20) pixels.

Reference 250 of depth map 200 indicates a cable at a considerable distance from a camera used to capture the image associated with the map 200. FIG. 2C shows an expanded view 270 of 250. In 270, the image of the cable 274 is overlaid on top of the depth estimates of the cable 272. It can be seen that, while the depth estimates of the cable are not very accurate and the depth boundaries do not align well with the actual edges of the cable, the depth values of the cable 272 do not bleed much into the background.

Depth estimates near depth boundaries are unreliable and do not align well with the actual edges of the associated objects. To improve the alignment, some further methods drop the estimated depth for a band of pixels at the depth boundaries, and replace the depth values with the estimated depth of nearby, similarly coloured pixels that are outside the band. For these further methods, the width of the band is fixed for an entire depth map, and an appropriate width has to be determined for each depth map. As described above, the fixed width only works well over a sub-range of depth. For instance, a width that works well for objects close to the camera will not work well for more distant objects and vice versa.

Other methods refine the depth map by minimising a cost defined by a cost function with a smoothness regulariser to ensure smooth variation in depth across the scene unless there is large change in pixel colour. Without taking into account the reliability issues of depth estimates at depth boundaries, these other methods typically over-smooth depth boundaries, in particular, at depth boundaries where the change in pixel colour is small.

In many applications, such as 3D visualisation and free-viewpoint video, accurate alignment between depth boundaries and object edges are needed. Poor alignment between depth boundaries and object edges can result in highly disagreeable visual artefacts in the output images or videos.

SUMMARY

It is an object of the present embodiments to substantially overcome, or at least ameliorate, one or more disadvantages of existing arrangements.

Disclosed are depth maps created using stereoscopic images, structured lights and LIDAR, captured from one or more views. The disclosed arrangements improve the alignment of depth boundaries and the edges of objects of an associated light camera image.

According to one aspect of the present disclosure, there is provided a method of refining a depth map, said method comprising:

determining a depth map by estimating a depth of pixels of an associated image;

dividing the depth map into connected components based on similarity of each of the pixels of the depth map;

selecting a band of pixels along a boundary of each of the connected components;

assigning a confidence score to pixels within each said band of pixels, wherein said confidence score increases with the estimated depth of the pixels; and updating the depth map based on the assigned confidence scores to determine a refined depth map.

According to another aspect of the present disclosure, there is provided an apparatus for refining a depth map, said apparatus comprising:

units for determining a depth map by estimating a depth of pixels of an associated image;

units for dividing the depth map into connected components based on similarity of each of the pixels of the depth map;

units for selecting a band of pixels along a boundary of each of the connected components;

units for assigning a confidence score to pixels within each said band of pixels, wherein said confidence score increases with the estimated depth of the pixels; and units for updating the depth map based on the assigned confidence scores to determine a refined depth map.

According to still another aspect of the present disclosure, there is provided a system for refining a depth map, said system comprising:

a memory for storing data and a computer program;

a processor coupled to the memory for executing the computer program, said computer program having instructions for:

determining a depth map by estimating a depth of pixels of an associated image;

dividing the depth map into connected components based on similarity of each of the pixels of the depth map;

selecting a band of pixels along a boundary of each of the connected components;

assigning a confidence score to pixels within each said band of pixels, wherein said confidence score increases with the estimated depth of the pixels; and updating the depth map based on the assigned confidence scores to determine a refined depth map.

According to another aspect of the present disclosure, there is provided a non-transitory computer readable medium having a program stored thereon for refining a depth map, said program comprising:

code for determining a depth map by estimating a depth of pixels of an associated image;

code for dividing the depth map into connected components based on similarity of each of the pixels of the depth map;

code for selecting a band of pixels along a boundary of each of the connected components;

code for assigning a confidence score to pixels within each said band of pixels, wherein said confidence score increases with the estimated depth of the pixels; and code for updating the depth map based on the assigned confidence scores to determine a refined depth map.

Other aspects are also disclosed.

BRIEF DESCRIPTION OF THE DRAWINGS

One or more embodiments will now be described with reference to the following drawings, in which.

DETAILED DESCRIPTION INCLUDING BEST MODE

Figure 1A:
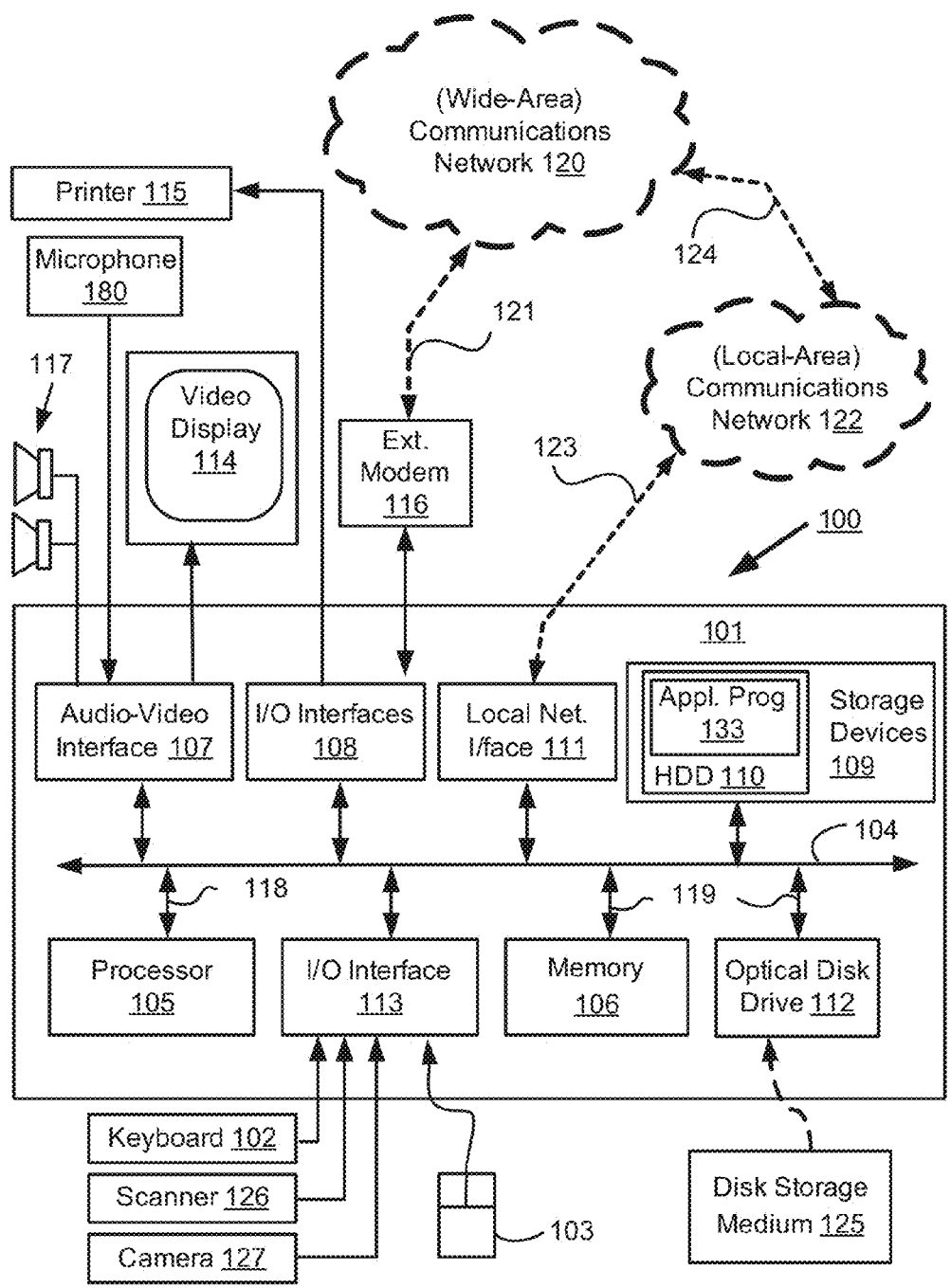
FIGS. 1A and 1B form a schematic block diagram of a general purpose computer upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Methods of refining a depth map are described below. The described methods seek to improve the alignment of depth boundaries of the depth map and edges of corresponding objects in an associated image. The described methods also seek to offer improved depth boundary/object edge alignment of the depth map with minimal computational cost and parameter tuning.

The arrangements presently disclosed may be implemented on a variety of hardware platforms, including in an imaging device such as a depth camera, or on a general purpose computer (PC), or in a cloud computing implementation.

Figure 1B:
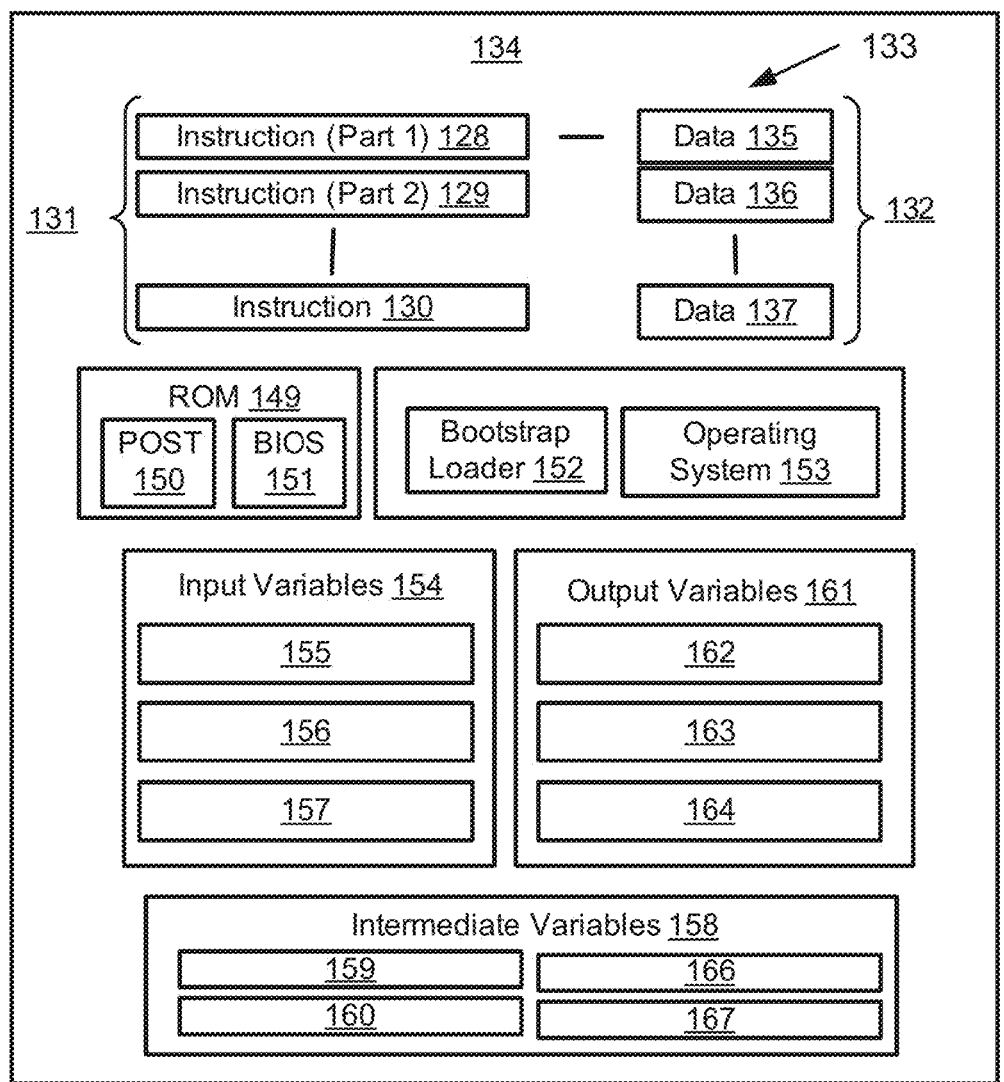
Figure 1B:
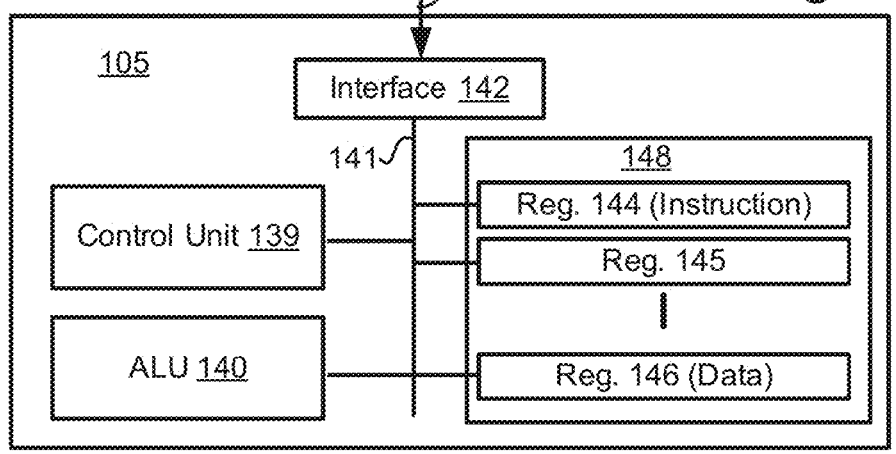

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. The camera 127 may be a still camera or a video camera. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practiced include IBM-PC's and compatibles, Sun Sparcstations, Apple Mac™ or a like computer systems.

Figure 4:
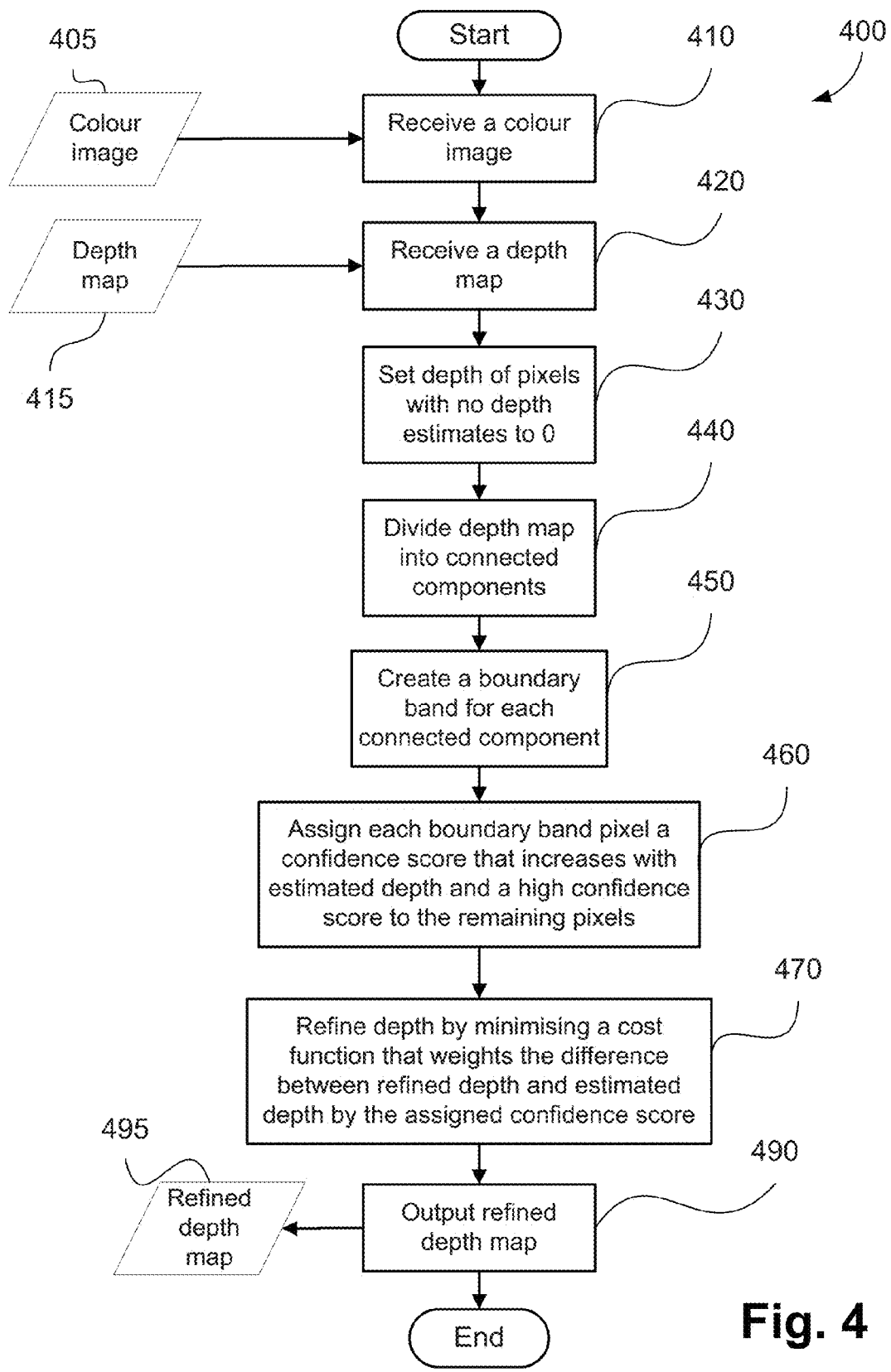
FIG. 4 is a schematic flow diagram showing a method of refining a depth map.

The described methods may be implemented using the computer system 100 wherein the process of FIG. 4, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user. In a cloud computing implementation, the application programs 133 may be executed on a server computer (not illustrated, but generally akin to the computer module 101) residing on either of the networks 120, 122 and interacting with the computer 101 for the supply of images received from the camera 127.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The described methods use input variables 154, which are stored in the memory 134 in corresponding memory locations 155, 156, 157. The described methods produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(i) a fetch operation, which fetches or reads an instruction 131 from a memory location 128, 129, 130;

(ii) a decode operation in which the control unit 139 determines which instruction has been fetched; and (iii) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIG. 4 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

In one arrangement, the camera 127 may be a depth camera that captures RGB-D images (that is, images that contains a depth channel in addition to the usual RGB colour channels) of a scene. The camera 127 may implement depth estimation and refinement algorithmic processes in order to produce and refine depth maps of the captured images to provide a refined depth map for various purposes. The refined depth map may be used for producing various visual effects such as changing the background of the images or producing 3D rendering of the scene. The refined depth map may alternatively be used for attaching depth information as image metadata to enable other post-processing operations. The refined depth map generated by the camera 127 may be retained in a memory of the camera 127 or the refined depth map may be written to a memory card or other memory storage device connectable to the camera 127. Alternatively, the refined depth map generated by the camera 127 may be uploaded to a cloud computing server connected to the network 120, for later retrieval by a user.

In another arrangement, the camera 127 may capture multiple RGB-D images of a scene which are subsequently transferred to the computer module 101. The computer module 101 or the like may implement a refinement method as one or more software modules of the software application program 133 to refine depth maps, which a user can use for further image processing operations. The RGB-D images may be retained in the memory 106 or written to a memory card or other memory storage device. At a later time, the images may be transferred to the computer module (e.g. 101), where the depth refinement process refines the depth maps.

In yet another arrangement, a cloud computing server or the like connected to the network 120 may implement the depth refinement processing in software to enable refining depth maps of RGB-D images. In such a cloud computer server arrangement, the camera 127 captures multiple RGB-D images of a scene. The images captured by the camera 127 are then uploaded to the cloud computing server, where the cloud computing server refines the associated depth maps and may then download the refined depth maps back to the camera 127, or store the refined depth maps for later retrieval by the user for further image processing operations.

Depth information of a scene is needed for many applications including 3D visualisation, free-viewpoint video, 3D reconstruction, etc. For these applications, depth information has to be acquired for all or a subset of the pixels of a colour (typically, RGB) image of a scene. Depth can be estimated using a number of methods including stereoscopic, structured-light and LIDAR methods resulting in a depth map (or depth image) of the scene. A depth camera uses a depth estimation method to capture a depth map in addition to the normal RGB colour image of a scene. The depth map typically has a lower spatial resolution than the associated colour image of the scene.

Typically, the depth of the surface of an object change slowly (relative to the depth range of a scene) and the characteristics of the surface also remains relatively unchanged over an extended area. Objects in a scene typically appear in a depth map as connected components with slowly changing depth estimates. Abrupt change in estimated depth can be used to separate objects or group of adjacent objects at different depths into different connected components. Regions with no depth estimates (that is, regions where the particular depth estimation method fails) can be assigned to one or more connected components that have undefined depth. Boundaries of these connected components where significant change in the estimated depth occurs between adjacent pixels may be referred to as depth boundaries.

The inner pixels of a connected component in the depth map typically correspond to the inner part of an associated object. These pixels are surrounded by pixels at similar depth and with similar surface characteristics. They are, in general, not affected by occlusion and less affected by object motion; hence, their estimated depth values are usually more reliable. However, the boundary of a connected component typically corresponds to the edge of an associated object. Their depth values cannot be estimated precisely due to occlusion, object motion, etc. Hence, depth estimates are typically unreliable at depth boundaries, resulting in poor alignment between depth boundaries and object edges.

A method 400 of refining a depth map is described below with reference to FIG. 4. Given a colour image of a scene and an associated depth map, the method 400 refines the depth map to improve the alignment between depth boundaries and object edges.

To refine the depth map, the depth map is first divided into connected components with slowly varying estimated depth values. A band of pixels at the boundary of each connected component is then selected. The band of pixels may be referred to as a boundary band. The estimated depth values of the boundary band pixels are considered less reliable than those of the remaining pixels of the connected component.

A confidence score is then assigned to each pixel with lower confidence scores assigned to pixels of the boundary bands and higher confidence scores to the remaining pixels. The depth estimates are then refined by minimising a cost function that contains a data cost term and a smoothness cost term. That is, for a set of pixels $\mathcal{P} = \{p\}$ with unknown depth values $f = \{f_p\}$, initial estimated depth values $\{z_p\}$ and assigned confidence scores $\{c_p\}$, the cost function is defined in accordance with Equation (2), as follows:

$$E(f) = \Sigma_{p \in \mathcal{P}} [\mathcal{V}(f_p; z_p, c_p) + \alpha \Sigma_{q \in \mathcal{N}_{(p)}} \mathcal{V}(f_p, f_q)] \quad (2)$$

where $\mathcal{N}(p)$ is the 4-connected or 8-connected neighborhood of a pixel p, $\mathcal{D}(\bullet)$ is a data cost term, $V(\bullet)$ is a smoothness cost term and $\alpha$ is a smoothness parameter that controls the relative contribution of the smoothness cost to the overall cost E.

The data cost term imposes a cost that penalises discrepancy between the (unknown) depth value $f_p$ and the initial estimated depth value $z_p$. The cost is weighted by the confidence score $c_p$ assigned to the pixel. The smoothness cost term penalises large changes in depth between adjacent pixels unless the change occurs at an object edge. Suitable example definitions for the confidence score in boundary pixels, the data cost term and the smoothness cost term will be defined below with reference to FIG. 4.

Since misalignment between depth boundaries and object edges is more pronounced for objects closer to the camera (that is, at small depth), the width of the boundary bands can be defined to vary with the average estimated depth of the associated connected components so that the width is larger when the average estimated depth of a connected component is smaller and smaller when the average depth of the connected components is larger. However, selecting boundary bands of different widths around connected components at different estimated depth is computationally expensive. Existing methods that use boundary bands invariably fix the width of the boundary bands.

There are two main issues for using a fixed width for the boundary bands. Firstly, for a scene with a large depth range, the selected width will work well only for objects within a depth sub-range improving depth boundaries/object edges alignment within that sub-range. Secondly, since different scenes may have different ranges of depth, a different width may have to be selected for each scene.

Figure 2A:
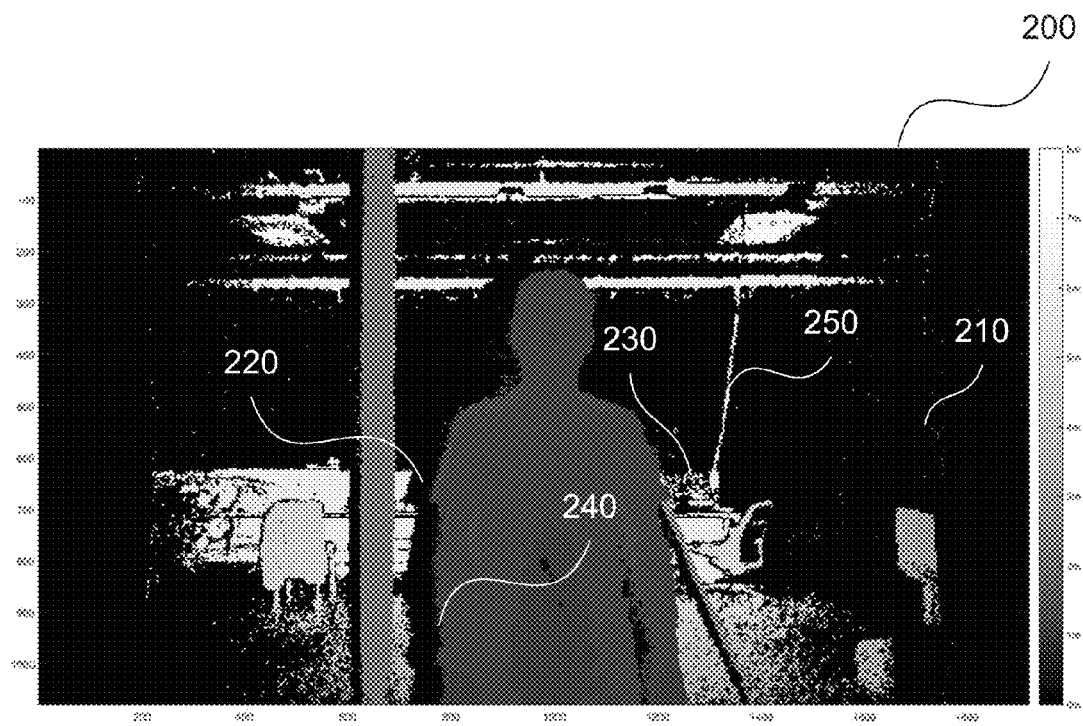
FIGS. 2A, 2B and 2C collectively show an example depth map used for illustrating depth estimation and alignment issues.

If the width of the boundary band is large, a thin, distant object such as the cable 250 of FIG. 2A, may fall entirely into a boundary band. Reference 350 of FIG. 3B indicates a wide 19-pixel wide boundary band 360 on either side of the cable 370 joins and covers the entire cable. In the case of some existing methods, where depth estimates within the boundary bands are replaced with depth estimates of similar, nearby pixels that are outside the boundary bands, the depth estimates of the entire cable 350 may be replaced with depths from the scene on either side of the cable and the cable will disappear from the refined depth map. Even if the initial depth estimates are not replaced but are all given a low confidence score, in some existing methods that include a depth refining step similar to step 470 of the method 400 as described below, the refining step can over-smooth the depth values of the cable incorrectly moving the depth estimates for the cable closer to those of the surrounding objects.

Figure 3A:
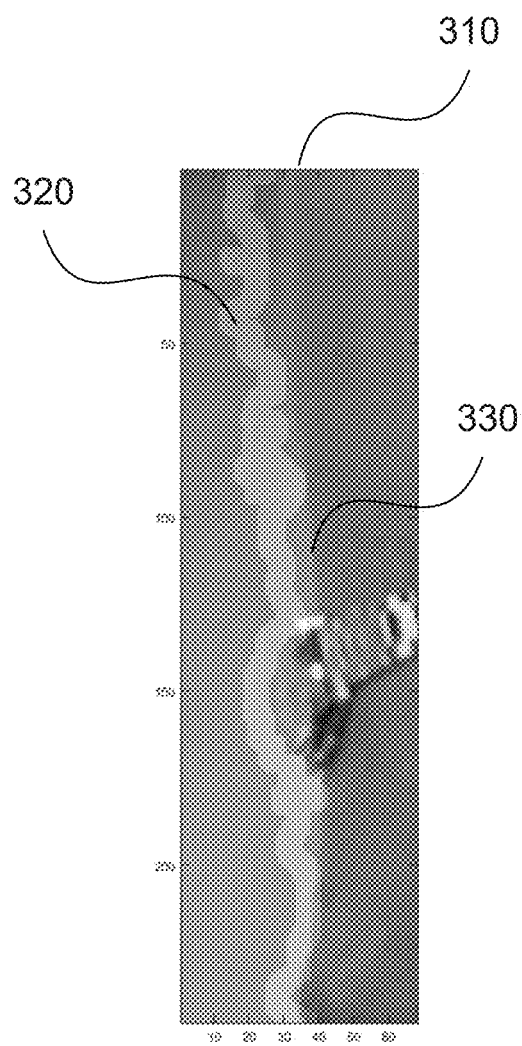
FIG. 3A is an example image showing the problem of using a fixed width for boundary bands.
Figure 3B:
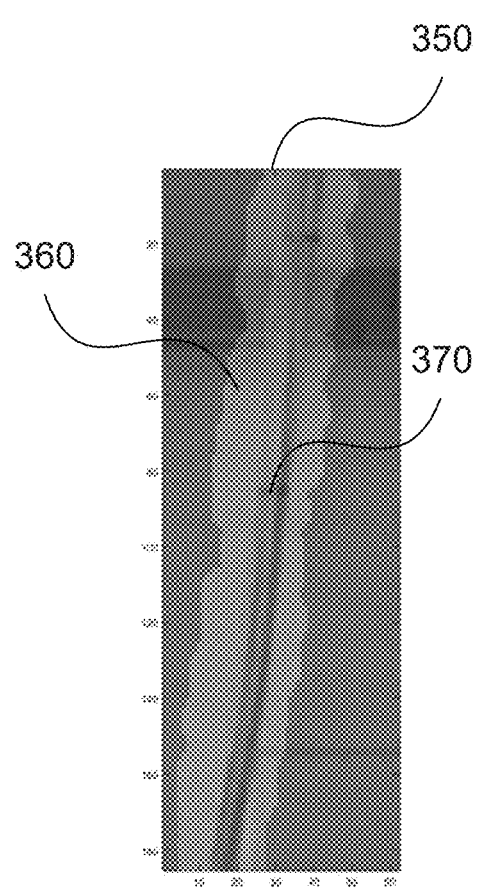
FIG. 3B is another example image showing the problem of using a fixed width for boundary bands.

If the width of the boundary band is small, then the narrow boundary band may not be able to cover all the unreliable depth estimates around an object close to the camera such as the person in FIG. 2A. Reference 310 of FIG. 3A shows how a narrow 7-pixel wide boundary band 320 misses most of the true edge of the arm 330. The refining step of some existing methods treats unreliable depth estimates outside the narrow boundary bands as reliable and uses the unreliable depth estimates to correct depth estimates within the boundary bands leaving some poor depth estimates uncorrected while corrupting some good depth estimates with poor depth estimates that are wrongly treated as reliable.

The method 400 uses a fixed width for the boundary bands to reduce computation, and assign confidence scores to the pixels of the boundary bands according to estimated depths determined for the pixels. A higher confidence score is assigned to pixels that have a higher estimated depth (i.e., are further away from the camera) and a lower confidence score is assigned to pixels that have a lower estimated depth (i.e., are closer to the camera). Assigning a higher confidence score to pixels that have a higher estimated depth allows the specification of a width for the boundary bands that is large enough to cover all unreliable depth estimates at depth boundaries close to the camera and have all unreliable depth estimates within these boundary bands assigned a low confidence score. At the same time, at depth boundaries further away from the camera, depth estimates within the wider than required boundary bands are assigned a higher confidence scores that matches their higher reliability.

As a result, the method 400 is able to align depth boundaries and object edges well over the entire depth range of a scene. The disclosed methods also make fine tuning the width of the boundary bands for each scene less important.

The method 400 of refining a depth map will now be described. The method 400 improves the alignment between the depth boundaries in the depth map and the corresponding object edges in the image. The method 400 may be implemented as one of more software code modules of the software application program 133, resident on the hard disk drive 110 and being controlled in its execution by the processor 105.

The method 400 starts at receiving step 410, where an image 405 of a scene is received, under execution of the processor 105. The image 405 may be stored in the memory 106. At a next receiving step 420, a depth map 415 corresponding to image 405 is received. The depth map 415 is determined by estimating a depth of pixels of the associated image 405. Again, the depth map 415 may be stored in the memory 106. Then at setting step 430, depth values of those pixels with no depth estimates in depth map 415 are set to zero under execution of the processor 105. Step 430 is not required if the process producing depth map 415 already sets the depth value of pixels with no depth estimates to zero.

At dividing step 440, the depth map 415 is divided into a set of connected components based on similarity of the depth value of each of the pixels of the depth map 415. The depth map 415 is divided into 4-connected or 8-connected pixels such that the depth estimates of each pair of connected pixels do not differ by more than a pre-defined threshold δ. In one arrangement, the threshold δ is set to five (5) cm. If the depth map is noisy, a pre-processing step such as a median filter of a predetermined filter size may be used to remove salt-and-pepper type noise before step 440 to suppress the creation of a large number of spurious, tiny connected components.

The method 400 continues at creating step 450, where a boundary band of a predetermined width co (e.g., nineteen (19) pixels) is created at the boundary of each connected component, under execution of the processor 105. The boundary band is created at step 450 by selecting a band of pixels along a boundary of each of the connected components of the depth map 415. In one arrangement, the boundary band of each connected component is created by applying a morphological dilation and a morphological erosion operation to the binary mask of the connected component using a disk-shape structuring element of diameter ω. The pixels added by the dilation operation together with the pixels removed by the erosion operation form the boundary band of the connected component.

In another arrangement, a rectangular structuring element that is wider in the horizontal direction is used to create a boundary band that is wider in the horizontal direction than the vertical direction. Using a rectangular structuring element that is wider in the horizontal direction is deemed advantageous because, as described earlier, depth maps generated using methods such as a stereoscopic method, structured light and LIDAR, typically exhibit larger misalignment between depth boundaries and object edges in the horizontal than the vertical direction.

Figure 5:
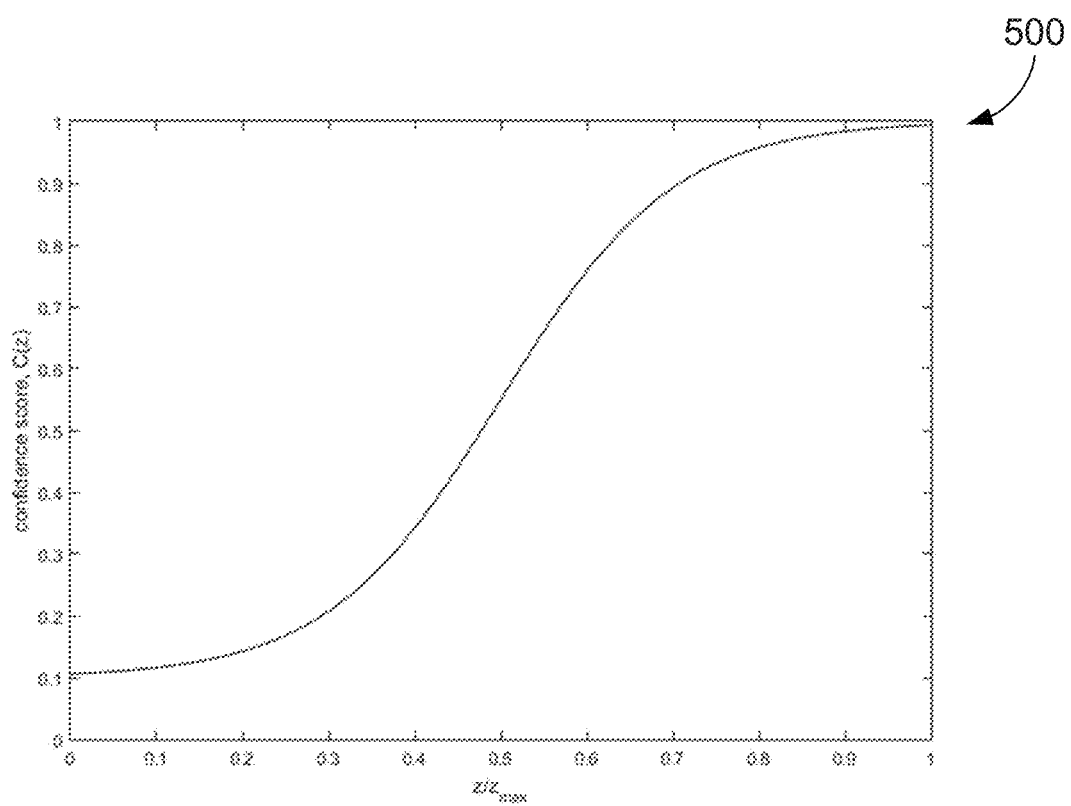
FIG. 5 is a sigmoid function of the estimated depth z used for determining a confidence score.

Then, at assigning step 460, a confidence score is assigned to pixels within each the band of pixels created at step 450 to create a confidence map. The confidence map is created by assigning to the depth estimate of the boundary band pixels a confidence score that increases with estimated depth of the boundary band pixels. Also at step 460, each remaining non-boundary band pixel is assigned to the depth estimates of a confidence score that is higher than the confidence scores assigned to the boundary band pixels. In one arrangement, a confidence score of one (1) is assigned to all non-boundary band pixels while the confidence score for the boundary band pixels is determined using a monotonically increasing sigmoid function of the estimated depth z, as defined in Equation (3) below:

$$C(z; \beta, z_{max}, C_{min}) = C_{min} + \frac{1 - C_{min}}{1 + e^{-\beta\left(2\frac{z}{z_{max}} - 1\right)}} \quad (3)$$

where $C_{min}$ is a predetermined minimum confidence score for pixels in the boundary bands, $z_{max}$ is the maximum value of the depth estimates in depth map 415 and β is a parameter that controls the steepness of the middle part of the sigmoid function. Setting $C_{min}=0.1$ and β=5 has been found to work well for many depth maps where $z_{max}$ is around ten (10) meters. FIG. 5 shows a graph of the function C(z; β, $z_{max}$, $C_{min}$) of Equation 3 with $C_{min}=0.1$, β=5, and $z_{max}=$ten (10) meters.

At refining step 470, the estimated depths are refined, under execution of the processor 105, by minimising a cost function of the form of Equation (2). The cost function includes a data cost term that penalises any difference between the unknown depth value $f_p$ and the initial estimated depth value $z_p$ of a pixel p. Also at step 470, the penalty is weighted by the confidence score $c_p$ assigned to pixel p. In one arrangement, the data cost function of Equation (4), below, is used at step 470.

$$\mathcal{D}(f_p; z_p, c_p) = c_p |f_p - z_p|^2 \qquad (4)$$

The cost function of Equation (4) also includes a smoothness cost term that penalises large change in depth value between adjacent pixels unless the change is accompanied by a large change in the colour of the pixels. Large change in pixel colour typically occurs when moving from one object to another over the edge of an object. The smoothness cost term is defined in accordance with Equation (5), below:

$$V(f_p, f_q) = \left[ \frac{|f_p - f_q|}{(\tau + \|I_p - I_q\|)} \right]^2 \qquad (5)$$

where $I_p$ is the colour of pixel p and $\tau$ controls how sensitive the smoothness cost is to colour difference between the neighbouring pixels p and q.

The cost function of Equation (4) may be minimised using a number of well-known methods including loopy belief propagation (LBP), iterated conditional modes (ICM), mean field (MF) method, etc, to determine a local minimum. In one arrangement, the iterated conditional modes (ICM) method is used to minimise the cost function of Equation (4).

The method 400 concludes at refining step 490, where a refined depth map 495 corresponding to image 405 is determined from the refined depth values $\{f_p\}$ determined at step 470, under execution of the processor 105. The refined depth map may be determined at step 490, under execution of the processor 105, and be stored in the memory 106.

As described above, the refined depth map 495 is determined by updating the depth map 415 based on the assigned confidence scores.

Figures 2B, 2C:
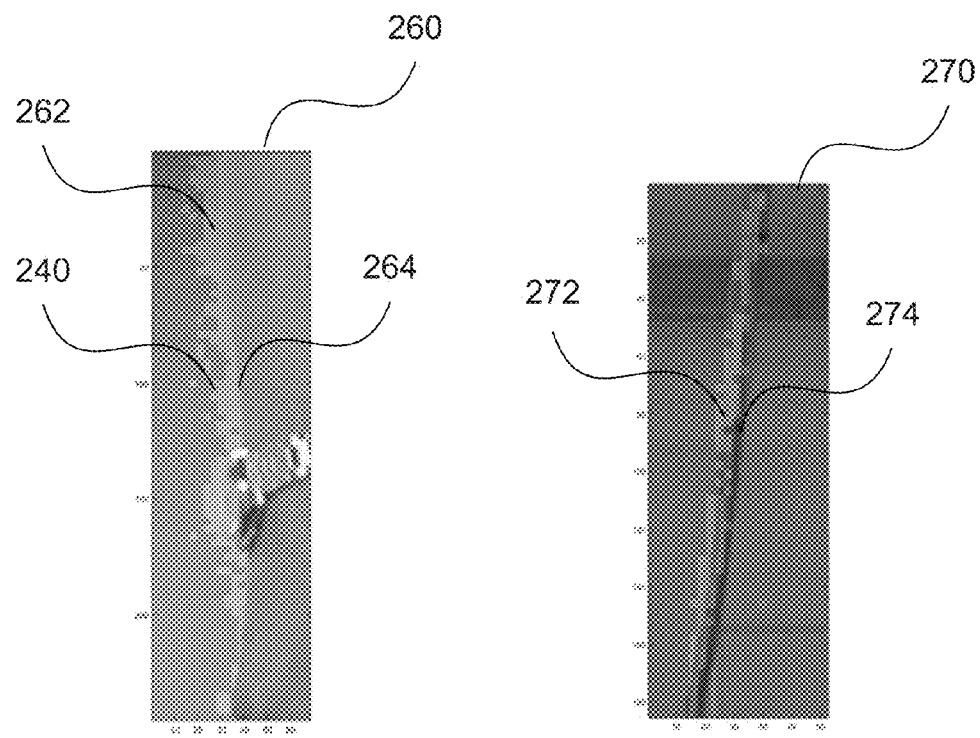
Figure 6A:
FIGS. 6A, 6B and 6C each show an example image at a different stage of the method of FIG. 4.
Figure 6B:
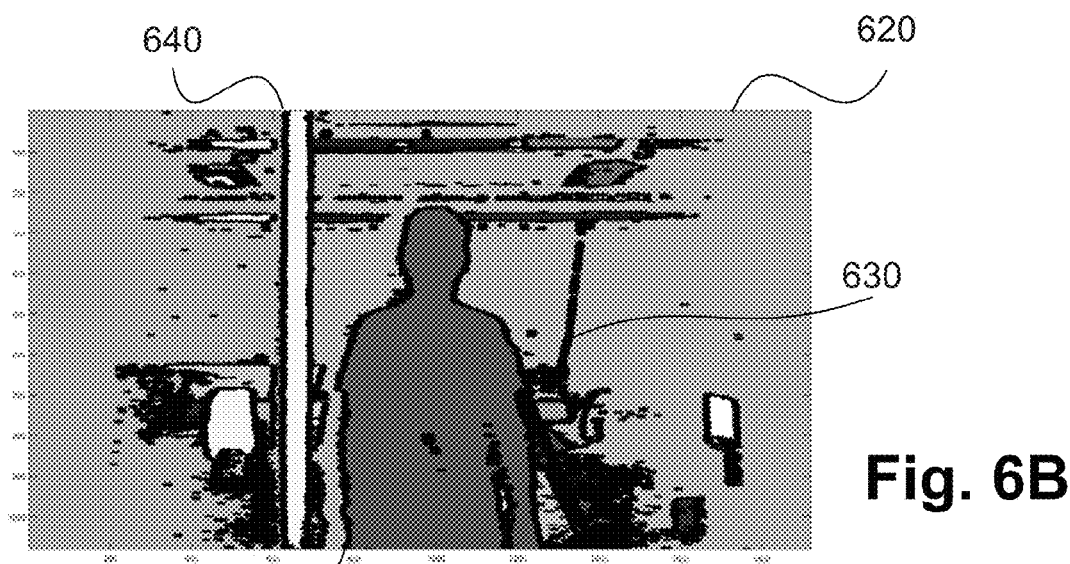
Figure 6C:
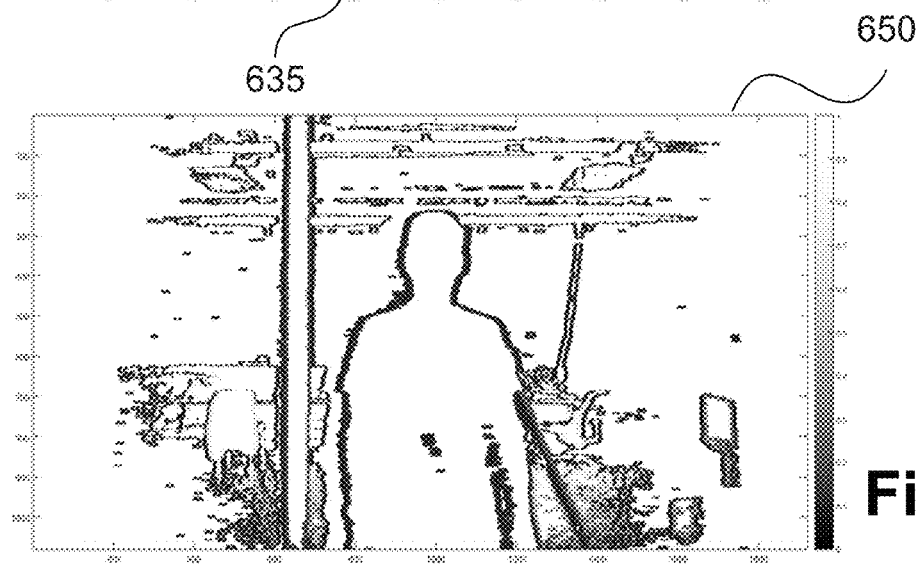

FIGS. 6A, 6B and 6C are images 610, 620 and 650, respectively, showing the results at different stages of the method 400 of FIG. 4 when refining the sample depth map 200 of FIG. 2.

After receiving the depth map 200 at step 420 and an associated image at step 410, the method 400 sets the estimated depth of the pixels with no depth estimates in depth map 200 to zero (0) in step 430. Then, at step 440, depth map 200 is divided into a set of connected components. Image 610 of FIG. 6A is an example image showing the connected components in different shades of grey resulting from step 440 for the sample depth map 200.

At step 450, a boundary band of pixels is created around each connected component of the image 610 using morphological operations and a 19×5-pixels rectangular structuring element. Image 620 of FIG. 6B shows the boundary bands such as 630, 635, 640 as a band of black pixels around the connected components of the image 610.

Figure 7A:
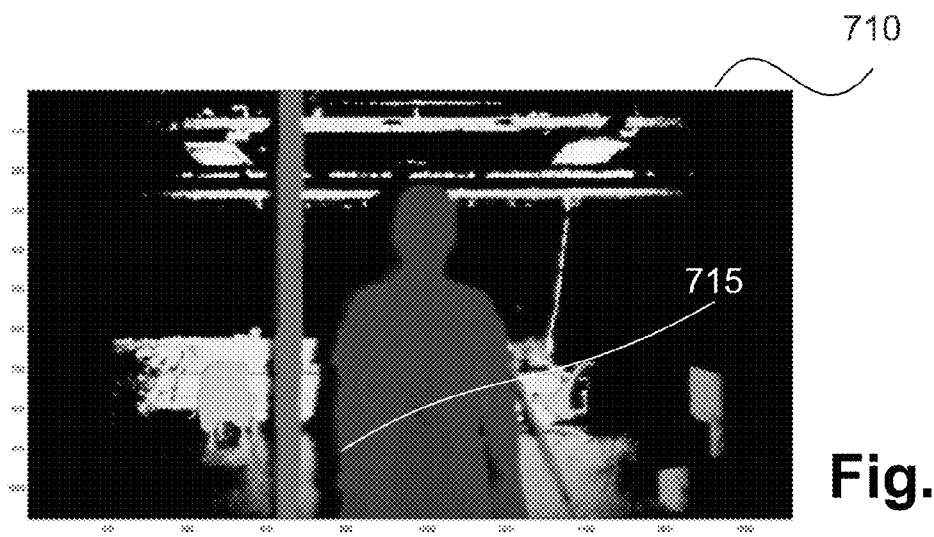
FIG. 7A is a refined depth map generated in accordance with the method of FIG. 4.
Figure 7B:
FIG. 7B is a refined depth map generated in accordance with the method of FIG. 4, using a fixed confidence score.

Then, at step 460, a confidence score is determined using Equation (3) (with $C_{min} = 0.1$, $\beta = 5$ and $z_{max} = 8$ m) and assigned to each pixel in the boundary band while a confidence score of one (1) is assigned to all remaining non-boundary band pixels creating the confidence map 650 where black corresponds to a confidence score of zero (0) and white to a confidence score of one (1). As a result, pixels in the boundary bands with higher estimated depths are given higher confidence scores. At step 470, the depth map 200 is then refined by minimising the cost function of Equation (2) with Equations (4) and (5) as the data cost term and smoothness cost term, respectively, using the ICM method. The smoothing parameter $\alpha$ is set to 0.2 and the parameter $\tau$ is set to 0.025 which work well for many depth maps where $z_{max}$ is around ten (10) meters. Then, finally, at step 490, the refined depth map 710 of FIG. 7A is determined and output.

If, at step 460, instead of assigning a confidence score that increases with estimated depth to each boundary band pixel, a fixed confidence score of 0.1 is assigned, the refined depth map 730 is produced in accordance with the method 400 of FIG. 4. In 730, more distant objects such as the cable 735 which corresponds to 250 of FIG. 2, have been over-smoothed as a result of using boundary bands with a fixed confidence score (that does not vary with estimated depth). In contrast, no significant over-smoothing is observed in the refined depth map 710 produced by method 400.

Figure 7C:
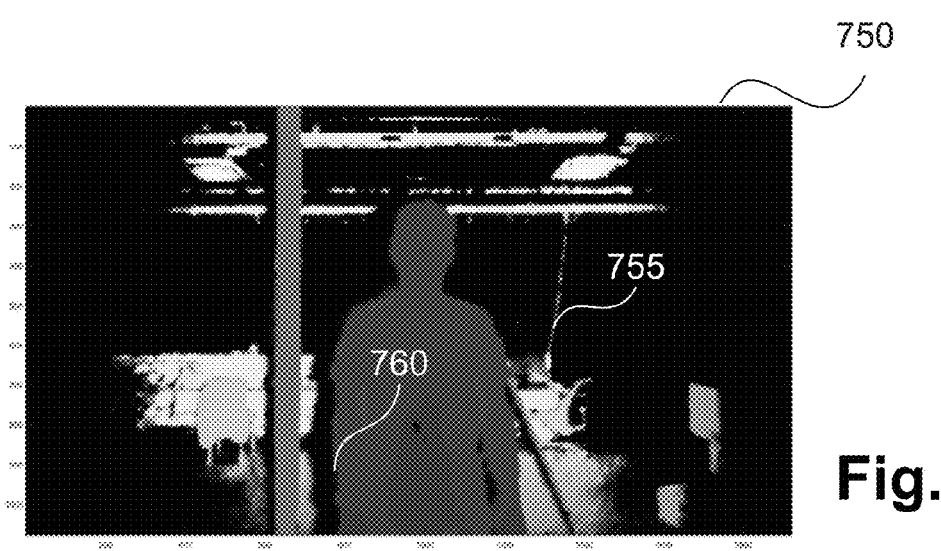
FIG. 7C is a refined depth map generated in accordance with the method of FIG. 4.

If, in addition to having a fixed, lower confidence score for pixels in the boundary bands, the boundary bands are also made narrower by using a 7×5-pixels rectangular structuring element at step 450, the refined depth map 750 of FIG. 7C is produced in accordance with the method 400. In the example of FIG. 7C, the cable 755 is still over-smoothed but to a lesser degree than cable 735 in 730. At the same time, for the refined depth map 750, the depth boundary of closer objects such as the depth boundary of the right arm 760 which corresponds to 240 of FIG. 2, aligns poorly with the actual edge of the right arm.

Figures 8A, 8B:
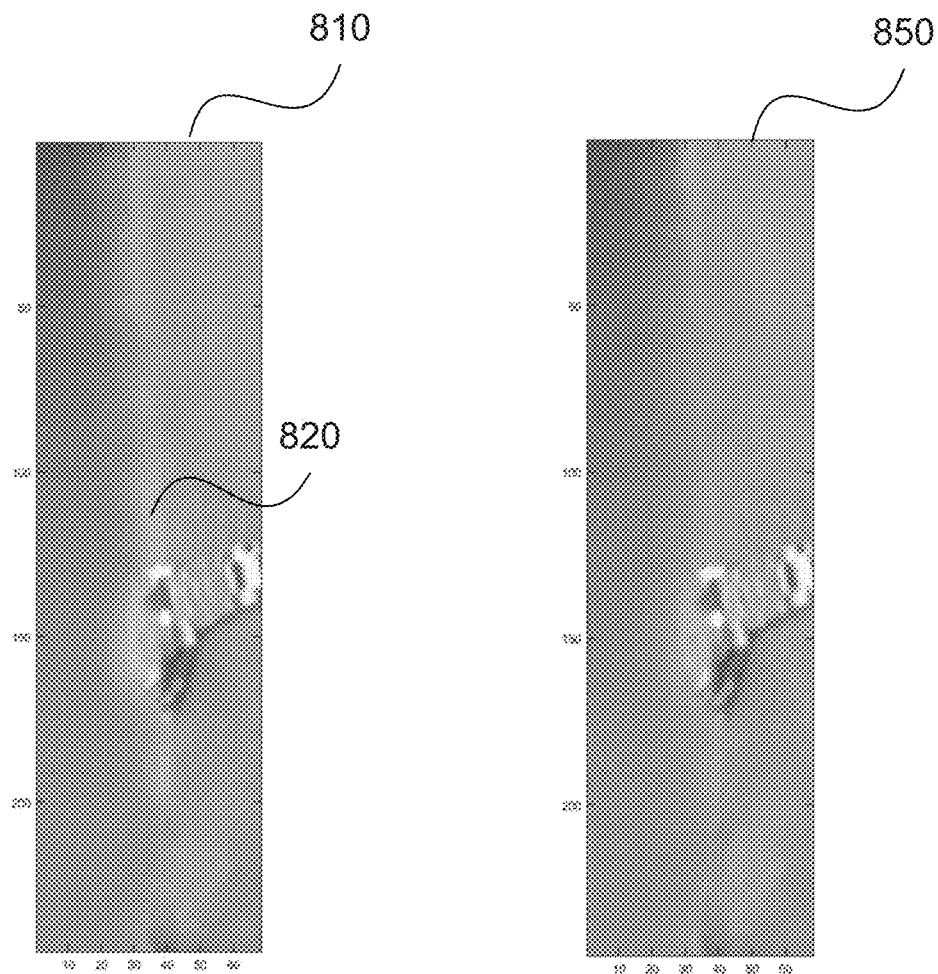
FIG. 8A is an expanded view of a region of the refined depth map of FIG. 7C.
FIG. 8B is an expanded view of the region for the refined depth map of FIG. 7A.

FIG. 8A shows an expanded view 810 of the depth boundary 760. FIG. 8B shows an expanded view 850 of the same boundary 715 of the refined depth map 710 produced by method 400. For both 810 and 850, the image of the right arm is overlaid on top of the depth map such that any mis-alignment between the depth boundary and object edge appears as a white glow such as at reference 820 in 810 around the edge of the right arm. The lack of noticeable white glow along the edge of the right arm in 850 and the presence of significant white glow at 810 shows that using a boundary band that is too narrow will result in poorer alignment between depth boundary and object edges for objects at small depth.

Method 400 of FIG. 4, on the other hand, aligns depth boundaries and object edges well over the entire depth range of the sample scene when the width of the boundary bands are set wide enough to include all unreliable depth estimates at the depth boundaries of even the closest objects.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method of refining a depth map, said method comprising:
    determining a depth map by estimating a depth of pixels of an associated image;

dividing the depth map into connected components based on similarity of each of the pixels of the depth map;

selecting a band of pixels along a boundary of each of the connected components;

assigning a confidence score to pixels within each said band of pixels, wherein said confidence score increases with the estimated depth of the pixels; and updating the depth map based on the assigned confidence scores to determine a refined depth map.

2. The method according to claim 1, wherein a larger confidence score is assigned to a pixel at greater estimated depth.

3. The method according to claim 1, wherein morphological operations are used to select the band of pixels.

4. The method according to claim 1, wherein a structuring element that is wider in a horizontal direction than a vertical direction is used to select the band of pixels.

5. The method according to claim 1, further comprising modifying a cost function with a data cost term to update the depth map.

6. The method according to claim 5, wherein the data cost term is weighted by said assigned confidence scores.

7. The method according to claim 6, wherein the data cost term is weighted by a smoothness cost term.

8. An apparatus for refining a depth map, said apparatus comprising:

units for determining a depth map by estimating a depth of pixels of an associated image;

units for dividing the depth map into connected components based on similarity of each of the pixels of the depth map;

units for selecting a band of pixels along a boundary of each of the connected components;

units for assigning a confidence score to pixels within each said band of pixels, wherein said confidence score increases with the estimated depth of the pixels; and units for updating the depth map based on the assigned confidence scores to determine a refined depth map.

9. A system for refining a depth map, said system comprising:

a memory for storing data and a computer program;

a processor coupled to the memory for executing the computer program, said computer program having instructions for:

determining a depth map by estimating a depth of pixels of an associated image;

dividing the depth map into connected components based on similarity of each of the pixels of the depth map;

selecting a band of pixels along a boundary of each of the connected components;

assigning a confidence score to pixels within each said band of pixels, wherein said confidence score increases with the estimated depth of the pixels; and updating the depth map based on the assigned confidence scores to determine a refined depth map.

10. A non-transitory computer readable medium having a program stored thereon for refining a depth map, said program comprising:

code for determining a depth map by estimating a depth of pixels of an associated image;

code for dividing the depth map into connected components based on similarity of each of the pixels of the depth map;

code for selecting a band of pixels along a boundary of each of the connected components;

code for assigning a confidence score to pixels within each said band of pixels, wherein said confidence score increases with the estimated depth of the pixels; and code for updating the depth map based on the assigned confidence scores to determine a refined depth map.

* * * * *